(12) United States Patent
Leung et al.

(10) Patent No.: US 6,464,742 B1
(45) Date of Patent: Oct. 15, 2002

(54) FLOATING AIR BREATHING POWER SOURCE (FABPS)

(75) Inventors: Fee Chan Leung, Hazlet, NJ (US); Terrill B. Atwater, N. Plainfield, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/524,670

(22) Filed: Mar. 13, 2000

(51) Int. Cl.[7] .............................. H04R 25/00; B25D 5/00
(52) U.S. Cl. ................. 55/385.4; 128/201.27; 429/27; 427/245; 427/246; 524/720; 525/431
(58) Field of Search .............................. 55/385.6, 325.4; 96/13, 14; 128/201.27; 429/27; 427/245, 246, 387; 428/447; 524/720; 525/431

(56) References Cited

U.S. PATENT DOCUMENTS

| | | | | |
|---|---|---|---|---|
| 183,521 A | * | 10/1876 | Wezk ..................... 128/201.27 |
| 5,123,434 A | * | 6/1992 | Fetterly ..................... 135/20.2 |
| 5,240,157 A | * | 8/1993 | Sezhost ..................... 224/639 |
| 5,606,967 A | * | 3/1997 | Wang ..................... 128/201.27 |
| 5,724,431 A | * | 3/1998 | Retter et al. ..................... 429/27 |
| 5,789,025 A | * | 8/1998 | St. Clair ..................... 427/245 |
| 5,914,415 A | * | 6/1999 | Tazn ..................... 55/385.4 |
| 6,014,637 A | * | 1/2000 | St. Clair ..................... 428/447 |
| D425,016 S | * | 5/2000 | Buckle ..................... 429/27 |
| D426,188 S | * | 6/2000 | Buckle ..................... 429/27 |
| 6,134,712 A | * | 10/2000 | Speztor ..................... 224/577 |

* cited by examiner

Primary Examiner—David A. Simmons
Assistant Examiner—Minh-Chan T. Pham
(74) Attorney, Agent, or Firm—Michael Zelenka; George B. Tereschuk

(57) ABSTRACT

An air breathing power source is mounted in a water impervious housing with a hydrophobic membrane across an opening in its top surface. The housing is secured by flexible straps over a users shoulders so that it is normally carried across the users back, but floats up with the air breathing top surface above the water when the user enters water up to and above shoulder level.

12 Claims, 2 Drawing Sheets

FLOATING AIR BREATHING POWER SOURCE (FABPS)

GOVERNMENT INTEREST

The invention described herein may be manufactured, used, and licensed by or for the Government for governmental purposes without the payment to us of any royalty thereon.

BACKGROUND OF THE INVENTION

This invention relates to portable power supplies and more specifically relates to a novel housing for an air battery which can operate even when carried in and through water.

Portable power sources that can run man-worn electronics particularly for military purposes are known. For example, soldiers can carry lithium batteries to power man-worn electronics. Users desire 72 hours of battery operation before resupply of power is needed. An air breathing battery (such as zinc air) is known, and can power man-worn electronics and can also be used to recharge other batteries for handheld devices. Air batteries can provide up to 250 watt-hours of energy per pound of battery versus only 80 watt-hours of energy per pound for current military lithium batteries.

However, air breathing batteries or power systems require ambient air to operate and cannot operate man-worn electronics if immersed in water during water fording operations.

BRIEF DESCRIPTION OF THE INVENTION

A novel floating housing is provided for an air battery to permit its use when its user is in water, for example while fording a river, to permit the uninterrupted use of the electronics powered by the battery. The novel housing is a sealed housing but has a top surface with an air intake covered by a hydrophobic but air permeable membrane. The top surface extends to sloping sides which will easily shed water and the container is relatively shallow with a center of mass close to the center of its bottom surface. The housing is secured to the user by shoulder straps which permit the flat housing to float from a horizontal position on the users back to a vertical position atop the level of water in which the user may be immersed. Thus even though the user is in water to a level of his shoulders or nose, the novel battery housing will still be able to breathe the air needed for the operation of the power source through the hydrophic membrane.

Thus, the novel floating air breathing power source (FABPS) of the invention will:

1. Provide power to operate manpack electronic devices and/or power manpack battery chargers 2. Use ambient air as a reactant to produce electric power 3. Allow the power source to receive ambient air even when the user is up to his/her nose in water.

4. Use air window closure materials that will shed water (hydrophobic) but will allow the passage of ambient air into power source.

5. Be modular and replaceable by the user without special training or tools.

DETAILED DESCRIPTION OF THE FIGURES

Figure 1:
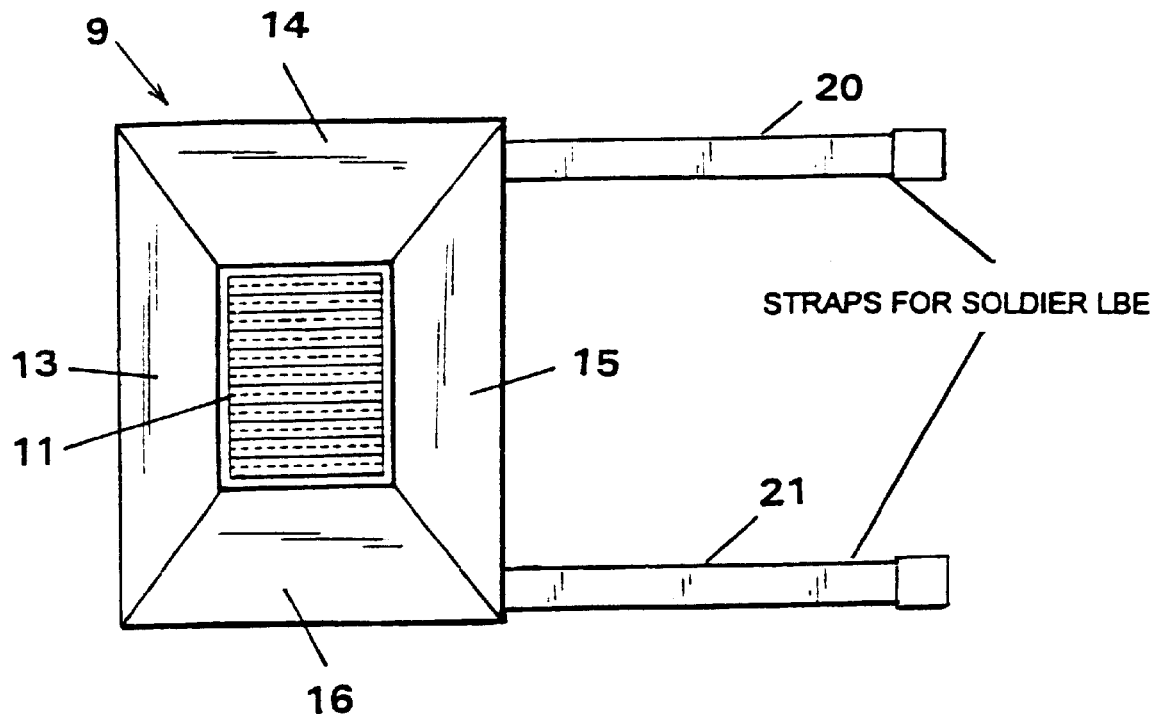
FIG. 1 is a top view of the novel housing of the invention.
Figure 2:
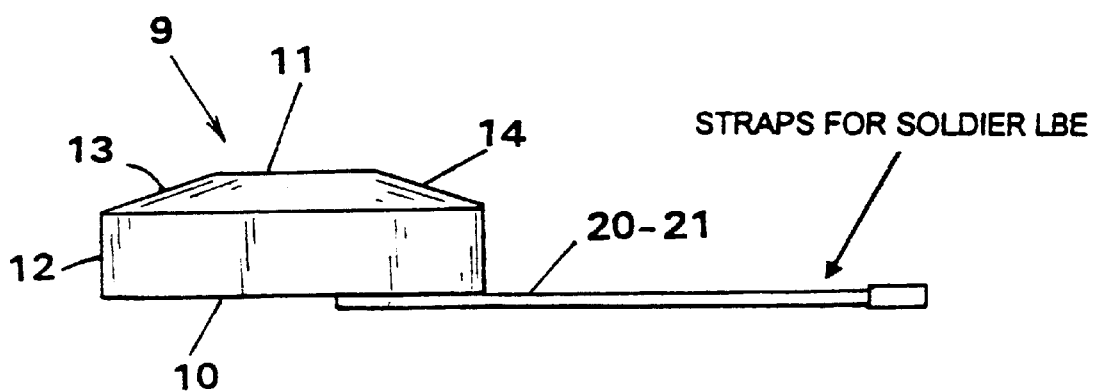
FIG. 2 is a side view of the novel housing of the invention.

The FABPS 9 of the invention is shown in FIGS. 1 and 2 and consists of a flat housing having a bottom surface 10, a top surface 11, an outer enclosed vertical side edge 12 and sloping sides 13, 14, 15 and 16 which join the top surface 11 to vertical edge 12 and permit water run off. Any suitable geometry can be used, other than that of FIGS. 1 and 2 in order to enclose an air breathing battery and to create a sufficiently large volume relative to the battery to cause the housing to float on water. Significant to the invention, the top surface 11 is either a full or partial hydrophobic, air permeable membrane. Thus, if the housing should be immersed in water, the top surface 11 will face upward and will communicate with air to permit the continued operation of the air battery.

Figure 3:
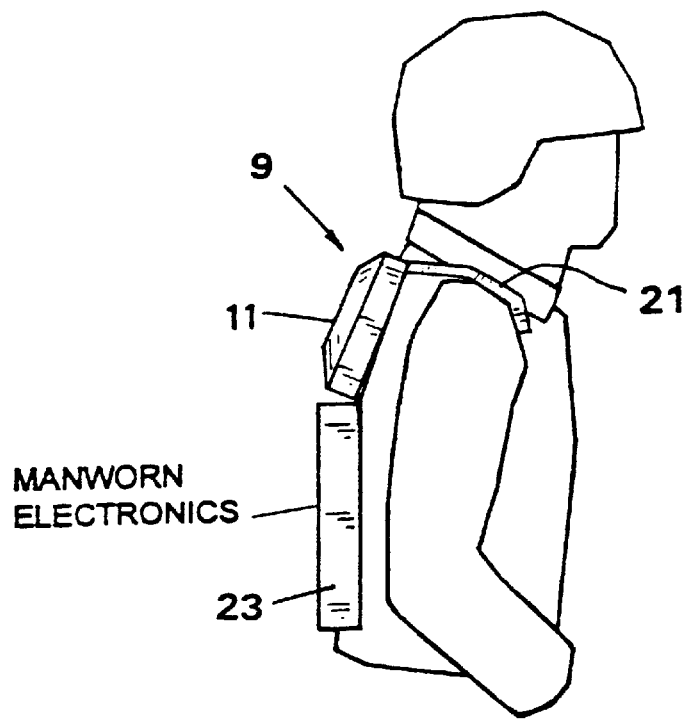
FIG. 3 is a side view of a soldier with the novel housing in its normal position.
Figure 4:
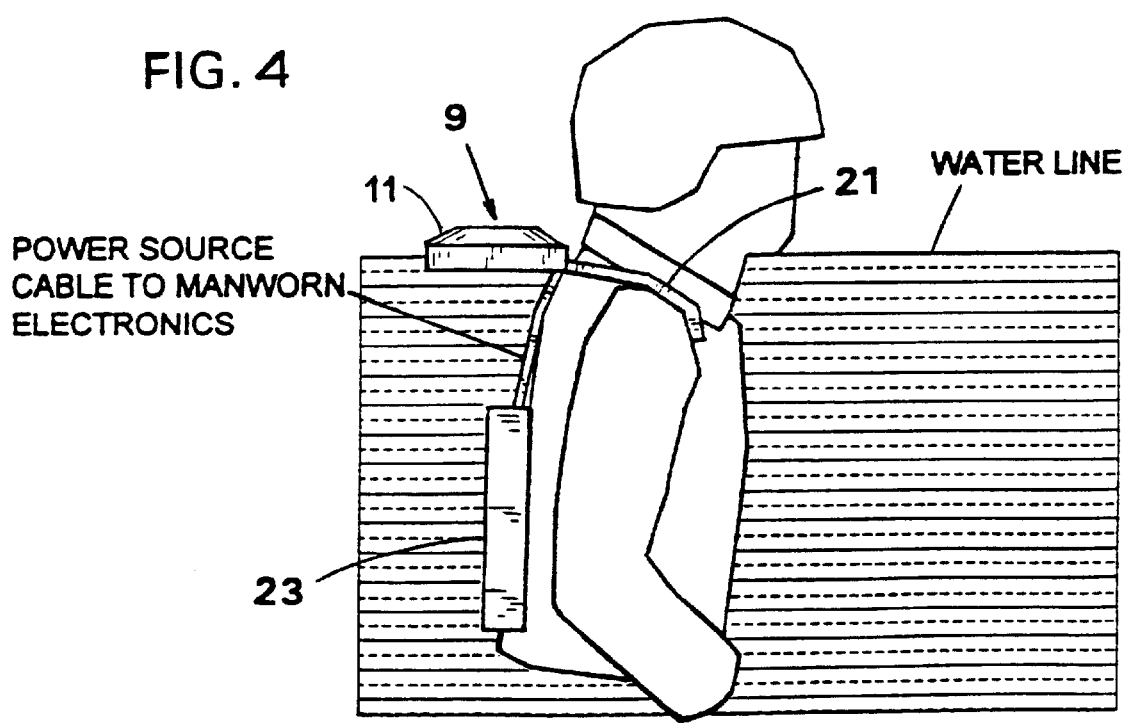
FIG. 4 is a side view like that of FIG. 3 with the housing afloat during a deep water operation.

The FABPS is preferably provided with flexible shoulder straps 20 and 21 which can be attached over a users shoulders with the bottom surface 10 normally against the users back as shown in FIG. 3. The FABPS 9 is generally flat (but no wider than the user's shoulders), lightweight and is carried by the user via straps 20, 21 like a backpack (see FIG. 3). Its thickness is preferably less than one-half its length or width. When the user wades into water and the water is higher than the user's shoulder but no higher than the user's nose as in FIG. 4, the FABPS 9 will float behind the user's head and keep the air intake 11 above water. This will allow the air breathing power source to continue to operate and power the man-worn electronics 23 during water fording or amphibious operations.

Should water contact occur (i.e. an ocean wave splashes over the soldier's head), the air intake 11 of the FABPS 9 hydrophobic membrane will repel the water but will allow the air to flow into the FABPS when possible. The FABPS air intake 11 can be designed with sloping sides 13 to 16 that will let the water run off if the air intake 11 is splashed with water. If the soldier loses his/her footing in the water and accidentally falls below the water surface, the FABPS 9 is designed to resist the effects of immersion. Thus, the hydrophobic membrane will prevent water from entering into the FABPS 9 and the air pocket trapped within the FABPS 9 will allow the air breathing power source to continue generating electric power. Once the soldier recovers footing, and stands upright, the FABPS 9 will float as in FIG. 3 and the water will run off the air intake.

The strap support system is provided to keep the FABPS from flailing during tactical movement and can be adjusted by the user to allow the FABPS 9 to float from the body during water operations.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A housing for an air breathing power source; said housing having top and bottom surfaces joined by a side surface and having a height which is less than about half of the width of said housing; said housing having an internal volume sufficiently large for said housing to float atop a water surface with said top surface above the water surface; said housing surfaces being impervious to water; at least a portion of said top surface being formed of a hydrophobic membrane which will allow the flow of air into said housing to supply said air breathing power sources.

2. The housing of claim 1, wherein said top and bottom surfaces are flat parallel surfaces; at least a portion of said side edge being tapered away from said top surface to permit the easy run off of the water from away from said top surface.

3. The housing of claim 1, wherein said bottom surface of said housing has spaced flexible straps extending therefrom which are securable over a users shoulders.

4. The housing of claim 2 wherein said bottom surface of said housing has spaced flexible straps extending therefrom which are securable over a users shoulders.

5. In combination; a man-worn electronics system and a air breathing power supply therefor and connected thereto; said air breathing power supply, having a floating housing which floats atop a water surface when a user of said air breathing power supply is immersed in the water; said housing having top and bottom surfaces joined by a side surface and having a height which is less than about half of the width of said housing; said housing having an internal volume sufficiently large for said housing to float atop the water surface with said top surface above the water surface; said housing surfaces being impervious to the water; at least a portion of said top surface being formed of a hydrophobic membrane which will allow the flow of air into said housing to supply said air breathing power sources; whereby said man-worn electronics system remains operable even though the user is in the water.

6. The combination of claim 5, wherein said top and bottom surfaces are flat parallel surfaces; at least a portion of said side edge being tapered away from said top surface to permit the easy run off of the water from away from said top surface.

7. The combination of claim 5, wherein said bottom surface of said housing has spaced flexible straps extending therefrom which are securable over a users shoulders.

8. The combination of claim 6, wherein said bottom surface of said housing has spaced flexible straps extending therefrom which are securable over a users shoulders.

9. The housing of claim 1, wherein the center of mass of said housing is disposed adjacent a central region of said bottom surface and being closer to said bottom surface than to said top surface, whereby said housing will float with said top surface facing upward.

10. The housing of claim 4, wherein the center of mass of said housing is disposed adjacent to a central region of said bottom surface, the center of mass being closer to said bottom surface than to said top surface, whereby said housing will float with said top surface facing upward.

11. The combination of claim 5, wherein the center of mass of said housing is disposed adjacent to a central region of said bottom surface, the center of mass being closer to said bottom surface than to said top surface, whereby said housing will float with said top surface facing upward.

12. The combination of claim 6, wherein the center of mass of said housing is disposed adjacent to a central region of said bottom surface, the center of mass being closer to said bottom surface than to said top surface, whereby said housing will float with said top surface facing upward.

* * * * *